United States Patent Office 2,820,832
Patented Jan. 21, 1958

2,820,832
PRODUCTION OF HYDROPEROXIDES

Kurt Helmut Berneis, Norton-on-Tees, England, assignor to Imperial Chemical Industries Limited, a corporation of Great Britain No Drawing. Application August 3, 1954
Serial No. 447,651

Claims priority, application Great Britain June 18, 1954

18 Claims. (Cl. 260—610)

This invention relates to the production of hydroperoxides.

It has already been proposed to produce isopropyl benzene hydroperoxide by contacting isopropyl benzene in the liquid phase, in the substantial absence of heavy metal oxidation catalysts, with a gas containing molecular oxygen at a temperature of 70° to 150° C. It has also been disclosed that the absence of soluble heavy metal oxidation catalysts is necessary, because these act as catalysts for the decomposition of isopropyl benzene hydroperoxide. Catalysts disclosed as capable of bringing about this decomposition reaction are soluble salts of metals such as copper, cobalt and manganese.

In contrast to the disclosure that soluble heavy metal oxidation catalysts have a deleterious effect on the production of hydroperoxides, it has also been disclosed to operate the process in the presence of 0.15% to 0.8% by weight of a soluble heavy metal oxidation catalyst. Compounds suitable for use as heavy metal oxidation catalysts in this reaction are said to be oxides, hydroxides and organic acid salts of manganese, cobalt, iron, lead, nickel, copper, vanadium, chromium and mercury.

It has been further disclosed that the production of hydroperoxides is facilitated by the presence of metallic copper or silver in the reaction vessel, or by carrying out the reaction in a vessel made of or lined with copper.

We have now found that copper and silver salts of organic acids are beneficial in the oxidation of aromatic hydrocarbons to hydroperoxides; the quantity of copper or silver salt employed is extremely critical, and must be appreciably less than the quantities hitherto disclosed if high yields of hydroperoxides are to be obtained. Furthermore, the use of a dissolved copper or silver salt is more convenient than using vessels made of or lined with copper or silver, and permits more accurate control than can be obtained by adding metallic copper or silver to the reaction vessel.

Thus, according to the present invention, there is provided a process for the production of hydroperoxides in which an aromatic hydrocarbon containing the grouping:

$$\text{Ar.}\underset{|}{\overset{|}{\text{C}}}\text{H}$$

where Ar is a phenyl group which may contain one or more alkyl substituents, and the tertiary carbon atom is a constituent of a saturated hydrocarbon radical selected from the group consisting of alkyl and cyclohexyl, is contacted with a gas containing free oxygen in the liquid phase at an elevated temperature in the presence of from 0.1 to 400 parts per million of copper or silver, based on the weight of hydrocarbon to be oxidised, the copper or silver being present initially as an organic acid salt which is soluble in the reaction mixture.

Aromatic hydrocarbons which may be used in the process of the present invention include cumene, cymenes, di-isopropyl benzenes, particularly those in which the isopropyl groups are in the 1:3 and 1:4 positions, sec.butyl benzene, di-sec.butyl benzenes, particularly those in which the sec.butyl groups are in the 1:3 and 1:4 positions, and cyclohexyl benzene. When using a hydrocarbon such as cumene, the product comprises cumene hydroperoxide; similarly, p-cymene gives p-cymene hydroperoxide. When the hydrocarbon contains two groups capable of undergoing oxidation to hydroperoxide groups, the product comprises a mixture of mono- and di-hydroperoxides. Thus, the oxidation of p-di-isopropyl benzene gives rise to p-di-isopropyl benzene mono-hydroperoxide and p-di-isopropyl benzene di-hydroperoxide.

A wide range of copper salts of organic acids may be used in the process of the present invention. An important difference in behaviour exists, however, between salts of acids having a low volatility under the reaction conditions (e. g. stearic, naphthenic and benzoic acid) and salts of acids which are relatively volatile under the reaction conditions such as formic acid.

When the copper salt of an organic acid having a low volatility under the reaction conditions is employed, the quantity of this salt should be such that the copper content of the reaction mixture (based on the weight of aromatic hydrocarbon to be oxidised) is from 1 to 20 parts per million, and preferably 1 to 4 parts per million. The optimum amount depends to some extent upon the actual salt employed; thus, when using copper stearate, a copper content of 2 parts per million is preferable, whereas with copper benzoate the optimum quantity is 4 parts per million.

It is a preferred feature of the process of the present invention to carry out the oxidation in the presence of a copper salt of an acid which is volatile under the reaction conditions. Thus, it is particularly advantageous to use copper formate as the catalyst. Without limiting the present application to the correctness of any particular theory, it is believed that free acids have a deleterious effect on the process of the present invention. During the course of the oxidation reaction, carboxylic acids are formed as by-products. When, for example, copper stearate is used as the additive, the free acids formed as by-products remain unchanged in the reaction zone. When however copper formate is employed, the free acids react with this, formic acid being liberated. Formic acid is volatile under the reaction conditions, and it is hence removed from the reaction zone. As a result, the use of copper formate tends to prevent the build-up of free acid in the reaction zone. It is a further feature of the present invention that when using a copper salt of an acid volatile under the reaction conditions, a considerably greater amount may be used than when employing the copper salt of an acid which is not volatile under the reaction conditions. Thus, when using copper formate, concentrations of this of up to 0.1 gm. per 100 gm. of hydrocarbon to be oxidised may be used, i. e. the copper content may be as high as 400 parts per million. Preferably, however, the copper content is maintained within the range of 4 to 12 parts per million.

Silver catalysts suitable for use in the process of the present invention are silver salts of acids such as acetic, stearic, naphthenic and benzoic acids. Preferably the silver content of the reaction mixture is 1 to 20 p. p. m. and more preferably 4 to 12 p. p. m., based upon the weight of hydrocarbon to be oxidised. Since silver formate does not exist, there is no salt derived from silver and an acid having a volatility under the reaction conditions approaching that of formic acid.

In order to get optimum yields of the hydroperoxide, it is advisable to restrict the reaction time so that the hydrocarbon is not completely converted. For example, in the case of cumene, it is advantageous to stop the reaction after 40 to 50% of the hydrocarbon has been oxidised.

The advantage of the present invention is illustrated by the following results. When operating according to the process of the prior art, oxygen was passed through cumene containing 0.5% by weight of manganese naphthenate at a rate of 6.7 litres per hour per kilogram of cumene. The reaction was carried out at a temperature of 45° C. After operating for 44 hours, 45% by weight of the cumene had undergone oxidation and 26.3% by weight of the starting material had been converted to cumene hydroperoxide. This corresponds to a yield of 58% by weight of cumene hydroperoxide based upon the amount of oxidation products obtained. In comparison with this, when operating according to the process of the present invention using copper benzoate as the catalyst in an amount sufficient to give a copper content of 2 parts per million and working at 120° C., the hydroperoxide yield after 2¾ hours, when 38.2% of the cumene had been converted to cumene hydroperoxide, was 85% by weight. Similarly, when using copper formate as catalyst in an amount sufficient to give a copper content of 4 parts per million, the yield of hydroperoxide after 3¼ hours, when 35.9% of the cumene had been converted to cumene hydroperoxide, was 90%. In view of the lower temperatures employed in the prior art process it is not surprising that the rate of reaction obtained is much lower than in the process of the present invention. The essential point of difference between the prior art process and that disclosed in the present application lies in the greatly superior yield obtained in the latter process, despite the higher reaction temperature, which results in more than a tenfold increase in reaction rate.

The process of the present invention is facilitated by the presence in the initial reaction mixture of a hydroperoxide. In general, it is satisfactory to use an amount of hydroperoxide which is at least 1% and preferably 3% or more of the weight of hydrocarbon to be oxidised. Preferably the hydroperoxide added is identical with the hydroperoxide which it is intended to produce; thus in the oxidation of cumene to cumene hydroperoxide it is desirable to add at least 3% by weight of cumene hydroperoxide to the cumene before carrying out the oxidation reaction. This cumene hydroperoxide content is conveniently provided by recycling a small quantity of cumene hydroperoxide from a previous run.

When it is desired to produce a di-alkyl benzene di-hydroperoxide, it is convenient to separate di-alkyl benzene dihydroperoxide from the reaction product and to recycle the residual product together with additional di-alkyl benzene to the reaction zone. In this way, the initial hydroperoxide content of the reaction mixture is conveniently provided.

The process of the present invention is conveniently operated at an elevated temperature in the range of 70° to 125° C. The optimum temperature will depend upon the hydrocarbon undergoing oxidation and on the presence of an inert solvent. It is also convenient to carry out the present process at atmospheric pressure but if desired elevated pressures may be used.

The process of the present invention is carried out by the use of a gas containing free oxygen. In particular, it is preferable to employ either air or substantially pure oxygen.

If desired the reaction may be carried out in the presence of suitable inert diluents; diluents which may be used include monochloro-benzene, mixtures of di-chloro-benzenes, higher chlorinated benzenes of the type which may be produced as by-products in the chlorination of benzene to chloro-benzene, and tetra-chloro-ethane. The use of diluents is particularly advantageous when oxidizing hydrocarbons which contain two groupings capable of being oxidised to hydroperoxide groupings. Thus, it is particularly desirable to use a diluent in the oxidation of para-di-isopropyl-benzene to para-di-isopropyl-benzene di-hydroperoxide. In carrying out reactions of this type in the presence of a solvent, the by-product formation is lower than when carrying out the reaction in the absence of a solvent, but at the same level of conversion of starting material.

The hydroperoxides produced by the process of the present invention may be used, for example, as accelerators in polymerisation and oxidation reactions. They are also important intermediates in the production of phenols and ketones; for example, cumene hydroperoxide may be converted to phenol and acetone by treatment with a mineral acid or with an activated earth.

EXAMPLE 1

In this example, samples of 200 mls. of purified cumene containing 3.5% by weight of cumene hydroperoxide contained in a glass vessel maintained at a temperature of 120° C. were contacted with oxygen, which was passed through the reaction mixture at a rate of 15 litres per hour. The samples contained a calculated quantity of copper benzoate varying from 0.0005 to 0.002 gram per 100 mls. of reaction mixture (i. e. 1 to 4 parts per million of copper). As a control, a separate sample of cumene, containing cumene hydroperoxide as described above, was subjected to oxidation under similar conditions but in the absence of copper benzoate. The results are given in Table I below.

Table I

| Additive | | Reaction time (hours) | Final peroxide content (percent by wt.) | Reaction rate (percent by wt. peroxide formed per hour) | Yield (percent by wt. of peroxide, based on oxidized material) |
|---|---|---|---|---|---|
| Copper benzoate (percent wt./vol.) | Copper content (p.p.m.) | | | | |
| Nil | Nil | 4.25 | 41.2 | 8.9 | 81.5 |
| 0.0005 | 1 | 3.25 | 40.3 | 11.3 | 82.5 |
| 0.001 | 2 | 2.75 | 38.2 | 12.6 | 85 |
| 0.002 | 4 | 5 | 19.1 | 3.1 | 62 |

This table shows that the optimum copper concentration is in the region of 2 parts per million; when the copper concentration is increased to 4 parts per million there is considerable deterioration in the yield of peroxide.

EXAMPLE 2

In this example, samples of solutions of p-di-isopropyl benzene were subjected to oxidation in a glass vessel at a temperature of 90° C. with a stream of oxygen at a rate of 5 litres per hour. Each of the samples subjected to oxidation contained 30 mls. of di-isopropyl benzene containing 95% of the para isomer and 5% of the meta isomer, 20 mls. of mono-chlorobenzene and 0.5 gram of p-di-isopropyl benzene di-hydroperoxide; in addition quantities of copper stearate up to 0.1 gram per 50 mls. of reaction mixture were incorporated; this corresponds to a copper concentration of up to 420 parts per million. The results are given in Table II below.

Table II

| Additive | | Reaction time (hours) | Final peroxide content (as percent wt./vol. monoperoxide formed per hr.) | Reaction rate (percent wt./vol. monoperoxide formed per hr.) | Composition of oxidised product | | |
|---|---|---|---|---|---|---|---|
| Copper stearate (percent wt./vol.) | Copper content (p.p.m.) | | | | Mono-peroxide (percent wt./wt.) | Para-di-peroxide (percent wt./wt.) | By-products (percent wt./wt.) |
| Nil | Nil | 7.5 | 2.6 | 0.1 | (²) | (²) | (²) |
| 0.0006 | 1 | 5.25 | 33.5 | 6.0 | 62.5 | 12.5 | 25 |
| 0.001 | 2 | 3.75 | 34.3 | 8.7 | 63.5 | 14 | 22.5 |
| 0.003 | 6 | 4.0 | 40.6 | 9.7 | 52.5 | 18 | 29.5 |
| 0.01 | 21 | 3.5 | 39.4 | 10.7 | 45.5 | 15.5 | 39 |
| 0.02 | 42 | 5.0 | 38.6 | 7.4 | 39 | 16 | 45 |
| 0.04 | 84 | 4.75 | 39.5 | 7.9 | 32 | 12 | 56 |
| 0.10 | 210 | 7.25 | 31.7 | 4.1 | 34.5 | 1 | 64.5 |
| 0.20 | 420 | 7.0 | 10.7 | 1.3 | 14 | 1 | 85 |

¹ This is based on the weight of di-isopropyl benzene.
² Mainly monoperoxide.

It will be seen from this table that the copper content is preferably in the range of 1 to 6 parts per million, based on the weight of di-isopropyl benzene employed; more preferably, the copper content is in the region of 2 parts per million.

EXAMPLE 3

Example 1 was repeated using copper formate in place of copper benzoate; the results are given in Table III below.

Table III

| Additive | | Final peroxide content (as percent wt./wt.) | Reaction rate (percent by wt. peroxide formed per hour) | Yield (percent by wt. of peroxide, based on oxidised material) |
|---|---|---|---|---|
| Copper formate (percent wt./vol.) | Copper content (p. p. m.) | | | |
| Nil | Nil | 41.2 | 8.9 | 81.5 |
| 0.0001 | 0.4 | 39.8 | 9.7 | 86.5 |
| 0.00025 | 1 | 40.8 | 9.9 | 87.0 |
| 0.001 | 4 | 35.9 | 10.0 | 90.0 |
| 0.002 | 8 | 35.7 | 10.7 | 88.0 |
| 0.003 | 12.5 | 39.9 | 11.7 | 90.5 |
| 0.004 | 16.5 | 36.8 | 11.4 | 85.5 |
| 0.006 | 25 | 38.5 | 10.5 | 85.5 |
| 0.010 | 41 | 38.5 | 10.0 | 85.5 |
| 0.100 | 410 | 39.0 | 10.1 | 82.5 |

From this table it will be seen that quantities of copper formate up to 0.100 gram per 100 grams of cumene may be employed without great detriment; this result is markedly different from that obtained using a copper salt of a non-volatile acid, for example, copper stearate. From Table III it will be seen that the optimum copper content is in the region of 4 to 12 p. p. m.

EXAMPLE 4

In this example, samples of 200 mls. of purified cumene containing 3.5% by weight of cumene hydroperoxide were subjected to oxidation in a glass vessel at a temperature of 120° C. with oxygen, which was passed through the reaction mixture at a rate of 15 litres per hour. One of the samples contained no metal salt additive; the other samples contained copper formate and silver acetate respectively. The results are given in Table IV below.

Table IV

| Additive | Content of additive | Reaction time (hours) | Final peroxide content (percent by wt.) | Reaction rate (percent by wt. peroxide formed per hr.) | Yield (percent by wt. of peroxide based on oxidised material) |
|---|---|---|---|---|---|
| Nil | | 4.25 | 41.2 | 8.9 | 81.5 |
| Copper formate | 12.5 p. p. m. of Cu | 3.1 | 39.9 | 11.7 | 90.5 |
| Silver acetate | 11 p. p. m. of Ag | 3 | 38.2 | 11.6 | 87 |

From this table, it will be seen that both copper formate and silver acetate, in the concentrations employed, exerted a beneficial effect both on the rate of cumene oxidation, and on the yield of hydroperoxide. From the standpoint of the yield of cumene hydroperoxide, copper formate is superior to silver acetate.

I claim:

1. A process for the production of hydroperoxides which comprises contacting an aromatic hydrocarbon containing the grouping:

where Ar is a phenyl group which may contain alkyl substituents and the carbon atom is a tertiary carbon atom which is a constituent of a saturated hydrocarbon radical selected from the group consisting of alkyl and cyclohexyl, in the liquid phase at an elevated temperature with a gas containing free oxygen in the presence of 0.1 to 400 parts per million, based on the weight of hydrocarbon to be oxidized, of a catalyst selected from the group consisting of silver, said silver being present initially as an organic acid salt which is soluble in the reaction mixture and copper, said copper being present initially as an organic acid salt of an acid selected from the group consisting of formic acid and acetic acid.

2. A process for the production of hydroperoxides which comprises contacting an aromatic hydrocarbon containing the grouping:

where Ar is a phenyl group which may contain alkyl substituents and the carbon atom is a tertiary carbon atom which is a constituent of a saturated hydrocarbon radical selected from the group consisting of alkyl and cyclohexyl, in the liquid phase at an elevated temperature with a gas containing free oxygen in the presence of 0.1 to 400 parts per million, based on he weight of hydrocarbon to be oxidized, of silver, said silver being present initially as an organic acid salt which is soluble in the reaction mixture.

3. The process of claim 2 wherein said temperature is in the range of 70° to 125° C.

4. The process of claim 2 wherein said aromatic hydrocarbon is selected from the group consisting of cumene, cymene, and sec.-butyl benzene.

5. The process of claim 2 wherein said gas containing free oxygen is selected from the group consisting of air and substantially pure oxygen.

6. A process for the production of hydroperoxides which comprises contacting an aromatic hydrocarbon containing the grouping:

where Ar is a phenyl group which may contain alkyl substituents and the carbon atom is a tertiary carbon atom which is a constituent of a saturated hydrocarbon radical selected from the group consisting of alkyl and cyclohexyl, in the liquid phase at an elevated temperature with a gas containing free oxygen in the presence of 0.1 to 400 parts per million, based on the weight of hydrocarbon to be oxidized, of silver, said silver being present initially as an organic acid salt which is soluble in the reaction mixture selected from the group consisting of silver acetate, silver stearate, silver naphthenate and silver benzoate.

7. A process as claimed in claim 6 in which the silver is present in an amount of from 1 to 20 parts per million based on the weight of the hydrocarbon to be oxidized.

8. A process as claimed in claim 6 in which the silver is present in an amount of 4 to 12 parts per million based on the weight of the hydrocarbon to be oxidized.

9. A process for the production of hydroperoxides which comprises contacting an aromatic hydrocarbon containing the grouping:

where Ar is a phenyl group which may contain alkyl substituents and the carbon atom is a tertiary carbon atom which is a constituent of a saturated hydrocarbon radical selected from the group consisting of alkyl and cyclohexyl, in the liquid phase with a gas containing free oxygen in the presence of 4 to 12 parts per million of copper, based on the weight of hydrocarbon to be oxidized, the copper being present initially as an organic salt of an acid selected from the group consisting of formic acid and acetic acid and the reaction being carried out at a temperature which lies between the boiling point of said acid and 125° C.

10. A process as claimed in claim 9 in which said aromatic hydrocarbon is selected from the group consisting of cumene, cymenes and sec. butyl benzene.

11. A process as claimed in claim 9 in which said gas containing free oxygen is selected from the group consisting of air and substantially pure oxygen.

12. A process as claimed in claim 9 in which the time of reaction is restricted so that a substantial proportion of the aromatic hydrocarbon is unconverted.

13. A process as claimed in claim 9 in which the reaction is carried out in the presence of an inert chlorine-containing organic diluent selected from the group consisting of mono-chlorobenzene, di-chlorobenzenes, higher chlorinated benzenes and tetra-chloroethane.

14. A process as claimed in claim 9 in which the initial reaction mixture contains at least 1% by weight of a hydroperoxide.

15. A process as claimed in claim 9 in which the reaction is carried out at an elevated temperature in the range of 70° to 125° C.

16. A process as claimed in claim 9 in which a di-alkyl benzene is oxidised to a mixture comprising the corresponding di-hydroperoxide, the said di-hydroperoxide being separated from the reaction product and the residual product being recycled together with additional di-alkyl benzene to the reaction zone.

17. A process for the production of mono- and dihydroperoxides which comprises contacting a di-isopropyl benzene in the liquid phase at an elevated temperature with a gas containing free oxygen in the presence of 4 to 12 parts per million, based on the weight of the hydrocarbon to be oxidized, of copper, the copper being present initially as an organic salt of an acid selected from the group consisting of formic acid and acetic acid and the reaction being carried out at a temperature which lies between the boiling point of the said acid and 125° C.

18. A process for the production of mono- and di-hydroperoxides which comprises contacting a di-sec. butyl benzene in the liquid phase at an elevated temperature with a gas containing free oxygen in the presence of 4 to 12 parts per million, based on the weight of the hydrocarbon to be oxidized, of copper, the copper being present initially as an organic salt of an acid selected from the group consisting of formic acid and acetic acid and the reaction being carried out at a temperature which lies between the boiling point of the said acid and 125° C.

References Cited in the file of this patent

UNITED STATES PATENTS

| | | |
|---|---|---|
| 2,655,545 | Bruning et al. | Oct. 13, 1953 |
| 2,664,447 | Lorand et al. | Dec. 29, 1953 |
| 2,664,448 | Lorand et al. | Dec. 29, 1953 |
| 2,681,937 | Mosnier et al. | June 22, 1954 |

FOREIGN PATENTS

| | | |
|---|---|---|
| 641,250 | Great Britain | Aug. 9, 1950 |